(12) United States Patent
Tranchina et al.

(10) Patent No.: US 10,028,031 B2
(45) Date of Patent: Jul. 17, 2018

(54) VEHICLE ENTERTAINMENT SYSTEM CAPABLE OF WIRELESS RECEPTION OF MEDIA CONTENT

(71) Applicant: VOXX INTERNATIONAL CORPORATION, Hauppauge, NY (US)

(72) Inventors: James R. Tranchina, Dix Hills, NY (US); Christopher J. Vitito, Celebration, FL (US)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 0 days.

(21) Appl. No.: 13/840,214

(22) Filed: Mar. 15, 2013

(65) Prior Publication Data
US 2013/0276036 A1 Oct. 17, 2013

Related U.S. Application Data

(63) Continuation-in-part of application No. 10/898,538, filed on Jul. 23, 2004.

(51) Int. Cl.
*H04N 21/654* (2011.01)
*G06F 3/14* (2006.01)
(Continued)

(52) U.S. Cl.
CPC ....... *H04N 21/654* (2013.01); *B60R 11/0235* (2013.01); *G06F 3/1423* (2013.01);
(Continued)

(58) Field of Classification Search
CPC .... H04N 21/2146; H04N 7/106; H04N 7/181; H04N 21/21461; H04N 21/41422; B64D 11/0015; H04H 20/62
See application file for complete search history.

(56) References Cited

U.S. PATENT DOCUMENTS 5,345,430 A 9/1994 Moe
5,557,541 A 9/1996 Schulhof et al.
(Continued)

OTHER PUBLICATIONS

U.S. Office Action dated Sep. 15, 2016 corresponding to U.S. Appl. No. 15/132,399.
(Continued)

*Primary Examiner* — Benjamin R Bruckart
*Assistant Examiner* — Anthony Bantamoi
(74) *Attorney, Agent, or Firm* — F. Chau & Associates, LLC

(57) ABSTRACT

A mobile entertainment system, comprising: a video system in combination with a media source, the video system and media source are attached to a housing secured within an automobile; the media source includes a storage medium upon which audio and video media content is stored for display upon the video system as desired by a user; an access point configured for wireless retrieval of audio and video media content for display upon the video monitor; a remote library of audio and video media content in wireless communication with the media source via the access point, the remote library including storage space for uploading of media content from a personal collection of audio and video media content from a user for subsequent transmission to the media source.

15 Claims, 7 Drawing Sheets

(51) Int. Cl.
*H04N 5/44* (2011.01)
*H04N 21/414* (2011.01)
*H04N 21/443* (2011.01)
*H04N 21/4363* (2011.01)
*B60R 11/02* (2006.01)
*H04N 5/765* (2006.01)
*H04M 1/60* (2006.01)
*H04N 21/433* (2011.01)
*B60R 11/00* (2006.01)

(52) U.S. Cl.
CPC .......... *H04N 5/4401* (2013.01); *H04N 5/765* (2013.01); *H04N 21/41422* (2013.01); *H04N 21/433* (2013.01); *H04N 21/43637* (2013.01); *B60R 2011/0028* (2013.01); *G09G 2370/16* (2013.01); *G09G 2380/10* (2013.01); *H04M 1/6075* (2013.01); *H04M 2250/02* (2013.01)

(56) References Cited

U.S. PATENT DOCUMENTS

| | | | |
|---|---|---|---|
| 5,634,209 A | 5/1997 | Prudhomme et al. | |
| 5,801,751 A | 9/1998 | Sklar et al. | |
| 5,822,023 A | 10/1998 | Suman et al. | |
| 5,973,722 A | 10/1999 | Wakai et al. | |
| 6,055,478 A | 4/2000 | Heron | |
| 6,249,913 B1 | 6/2001 | Galipeau et al. | |
| 6,300,880 B1 | 10/2001 | Sitnik | |
| 6,339,455 B1* | 1/2002 | Allan | B60R 11/0211 250/221 |
| 6,374,177 B1 | 4/2002 | Lee et al. | |
| 6,526,335 B1 | 2/2003 | Treyz et al. | |
| 6,559,773 B1 | 5/2003 | Berry | |
| 6,567,984 B1 | 5/2003 | Allport | |
| 6,741,841 B1 | 5/2004 | Mitchell | |
| 6,779,196 B1* | 8/2004 | Igbinadolor | G11B 27/028 725/75 |
| 7,159,232 B1 | 1/2007 | Blackketter et al. | |
| 7,302,465 B2 | 11/2007 | Ayres et al. | |
| 8,261,309 B2 | 9/2012 | Vitito | |
| 2001/0029410 A1 | 10/2001 | Obradovich | |
| 2002/0057891 A1 | 5/2002 | Shigaki | |
| 2002/0105507 A1* | 8/2002 | Tranchina | G06F 3/1423 345/204 |
| 2002/0198958 A1* | 12/2002 | Frenkiel et al. | 709/217 |
| 2003/0081935 A1 | 5/2003 | Kirmuss | |
| 2003/0135464 A1 | 7/2003 | Mourad et al. | |
| 2004/0049789 A1 | 3/2004 | Bower et al. | |
| 2004/0083491 A1* | 4/2004 | Chang | 725/75 |
| 2005/0267994 A1 | 12/2005 | Wong et al. | |
| 2006/0107295 A1* | 5/2006 | Margis | H04N 7/163 725/81 |
| 2006/0294551 A1 | 12/2006 | Cholewinsky | |
| 2008/0104642 A1* | 5/2008 | Galipeau | H04N 7/10 725/76 |
| 2009/0081947 A1* | 3/2009 | Margis | H04B 7/18508 455/3.02 |
| 2009/0307729 A1* | 12/2009 | Vitito | H04N 7/17318 725/75 |

OTHER PUBLICATIONS

U.S. Office Action dated Apr. 20, 2017 for U.S. Appl. No. 15/132,399.
U.S. Office Action dated Jan. 22, 2018 for U.S. Appl. No. 15/132,399.
U.S. Office Action dated Aug. 29, 2017 for U.S. Appl. No. 15/132,399.

* cited by examiner

VEHICLE ENTERTAINMENT SYSTEM CAPABLE OF WIRELESS RECEPTION OF MEDIA CONTENT

CROSS-REFERENCES TO RELATED APPLICATIONS

This application is a Continuation-In-Part of U.S. application Ser. No. 10/898,538, filed on Jul. 23, 2004, the disclosure of which is incorporated by reference in its entirety herein.

BACKGROUND OF THE INVENTION

1. Technical Field

The present disclosure relates generally to vehicle entertainment devices and, in particular, to a vehicle entertainment system capable of wireless reception of media content.

2. Discussion of the Related Art

As vehicles have been continuously updated to include new and useful features for the enjoyment and/or utility of a driver and his or her passengers, devices found in the home have made their way into vehicles. Such features include, for example, the television, the video cassette player (VCP), the compact disk (CD) player, and the digital video disk (DVD) player.

Recently, in homes and offices, there has been increased use of digital media files (e.g., JPEG or MPEG files) capable of being displayed or played on computers, cellular telephones, personal data assistants (PDAs) and digital video recorders (DVRs). In addition, with advances in wireless technology, digital media files are wirelessly transferred, for example, between devices such as cellular telephones or PDAs.

Accordingly, a need exists for a vehicle entertainment system which utilizes digital media files in combination with advances in wireless technology.

SUMMARY OF THE INVENTION

A console for a vehicle, in accordance with an embodiment of the present invention, comprises an assembly housing capable of being mounted in an interior of the vehicle, a wireless receiver, houseable in the assembly housing, adapted to wirelessly receive audio and video data from at least one input device, a recording device, houseable in the assembly housing for recording the audio and video data received from the at least one input device, and a wireless transmitter, houseable in the assembly housing, adapted to wirelessly transmit the audio and video data to at least one receiving device.

The console may further comprise a display device, houseable in the assembly housing and operatively coupled to at least one of the wireless receiver and the recording device for receiving at least one of the audio and video data for broadcast thereon. The at least one input device may be positioned in the vehicle and comprise at least one of a video cassette player (VCP), a television, a compact disk (CD) player, a digital video disk (DVD) player, a personal computer (PC), a laptop PC, a pager, a video game player, an MP3 player, a personal data assistant (PDA), a cellular telephone, a vehicle computer for transmitting information to the wireless receiver, and a GPS device for transmitting vehicle navigation information to the wireless receiver.

The at least one input device may be located remote from the vehicle and comprise at least one of a computer capable of accessing a database of media files, and a digital video recorder. The computer may access the media files via a local area network (LAN), a wide area network (WAN) or a global network.

The recording device may include a digital video recorder capable of storing about 50 hours to about 150 hours of digital audio and video programming. Digital video recorders capable of storing more or less programming may also be used. The at least one receiving device may comprise at least one of a cellular telephone, a personal computer (PC), a laptop PC, an MP3 player, a personal data assistant (PDA), a digital video recorder (DVR), a satellite radio, and an AM/FM radio. The at least one receiving device may also comprise a display positioned remote from the console.

The console may comprise a browser adapted to wirelessly interact with at least one of the Internet and the World Wide Web or other network and signal processing facilities adapted to perform at least one of signal processing and signal conversion, with respect to the audio and video data.

The audio and video data may be wirelessly transmitted between the console and the at least one input or receiving devices as at least one of radio frequency (RF) signals and infrared (IR) signals and in accordance with at least one of Bluetooth® and 802.11 techniques. Other wireless protocols or techniques may be employed, including, but not limited to, an in-vehicle wireless local area network (LAN).

The audio and video data may include at least two media programs, wherein the wireless transmitter transmits the at least two media programs to the at least one receiving device on at least two respective frequencies.

The console may further comprise another wireless transmitter, wherein the wireless transmitter transmits one of the at least two media programs to the at least one receiving device on a first frequency and said another wireless transmitter transmits another one of the at least two media programs to the at least one receiving device on a second frequency. The wireless transmitter also may transmit the at least two media programs to the at least one receiving device in a broadcast stream, wherein selection of one of the at least two media programs is made from a menu displayed on the at least one receiving device.

The wireless receiver may be adapted to wirelessly receive audio and video data from at least one other input device while simultaneously receiving the audio and video data from the at least one input device. The recording device may record the audio and video data received from both the at least one input device and the at least one other input device. The wireless transmitter may be adapted to selectively transmit the audio and video data from either the at least one input device or the at least one other input device to the at least one receiving device. The wireless transmitter may be adapted to simultaneously transmit the audio and video data from the at least one input device to the at least one receiving device and the audio and video data from the at least one other input device to at least one other receiving device.

A console for a vehicle, in accordance with another embodiment of the present invention, comprises an assembly housing capable of being mounted in an interior of the vehicle, a wireless transceiver, houseable in the assembly housing, adapted to wirelessly receive audio and video data from at least one input device and to wirelessly transmit the audio and video data to at least one receiving device, and a recording device, houseable in the assembly housing for recording the audio and video data received from the at least one input device.

A console for a vehicle, in accordance with another embodiment of the present invention, comprises an assembly housing capable of being mounted in an interior of the vehicle, a recording device, houseable in the assembly housing for recording audio and video data received from the at least one input device connected to the console via a wired connection, and a wireless transmitter, houseable in the assembly housing, adapted to wirelessly transmit the audio and video data to at least one receiving device.

The at least one input device may connect to the console via a distribution station. The wireless transmitter may be adapted selectively transmit one of at least two media programs to the at least one receiving device, and to simultaneously transmit one of at least two media programs to the at least one receiving device and another one of the at least two media programs to at least one other receiving device.

A mobile entertainment system is also provided, comprising: a video system in combination with a media source, the video system and media source are attached to a housing secured within an automobile; the media source includes a storage medium upon which audio and video media content is stored for display upon the video system as desired by a user; a wireless global communication network access point configured for retrieval of audio and video media content for display upon the video monitor; a remote library of audio and video media content in wireless communication with the media source via the wireless global communication network access point, the remote library including storage space for uploading of media content from a personal collection of audio and video media content from a user for subsequent transmission to the media source upon synchronization of the remote library with the media source thereby providing the user with access to a personal collection of audio and video content media.

BRIEF DESCRIPTION OF THE DRAWINGS

Preferred embodiments of the invention can be understood in more detail from the following descriptions taken in conjunction with the accompanying drawings in which.

DETAILED DESCRIPTION OF PREFERRED EMBODIMENTS

Preferred embodiments of the present invention will be described below in more detail with reference to the accompanying drawings. This invention may, however, be embodied in different forms and should not be construed as limited to the embodiments set forth herein. Rather, these embodiments are provided so that this disclosure will be thorough and complete, and will fully convey the scope of the invention to those skilled in the art.

It is to be understood that embodiments of the present invention may be implemented in various forms of hardware, software, firmware, special purpose processors, or a combination thereof. It is to be further understood that, because some of the constituent system components depicted in the accompanying Figures may be implemented in software, the actual connections between the system components may differ depending upon the manner in which the embodiments of the present invention are programmed. Given the teachings herein, one of ordinary skill in the related art will be able to contemplate these and similar implementations or configurations of the embodiments of the present invention.

The wireless signals referred to herein can be any type of wireless signal including, but not limited to, radio frequency (RF), infrared (IR), and optical signals. For RF signals, an antenna may be used to enhance reception.

Figure 1A:
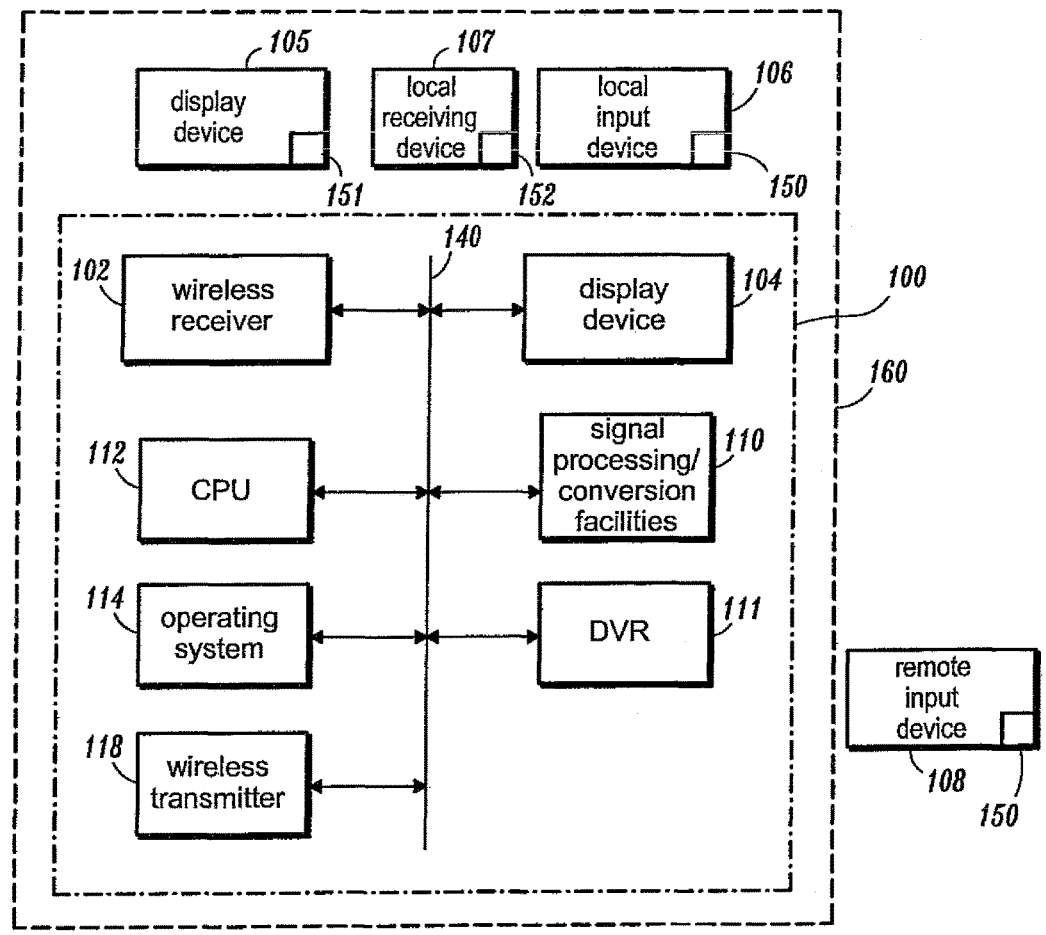
FIG. 1A is a block diagram illustrating a console in a vehicle according to an embodiment of the present invention.

FIG. 1A is a block diagram illustrating a mobile entertainment system which includes a housing or console 100 in a vehicle 160 according to an embodiment of the present invention. The console 100 is installed in a vehicle 160, for example, overhead to a vehicle ceiling, to a vehicle wall, to a vehicle seat, such as in a seat body or headrest, in a bag hanging from a seat or other structure in the vehicle interior, or any other appropriate location in the vehicle 160. The console 100 includes a wireless receiver 102, a display device 104, facilities for performing signal processing and/or signal conversion 110 (hereinafter "signal processing/conversion facilities"), a digital video recorder (DVR) 111, a processor (CPU) 112, an operating system 114, and a wireless transmitter 118. Some of the elements shown in FIG. 1 may be included in the console, in compartments comprised therein (not shown), or they may be separate from the console but nonetheless intended to interact with the console. The elements shown in FIG. 1 may be connected by one or more buses 140.

A local input device(s) 106, such as a video cassette player (VCP), a television, a compact disk (CD) player, a digital video disk (DVD) player, a personal computer (PC), a laptop PC, a pager, a video game player, an MP3 player, a personal data assistant (PDA) and a cellular telephone, is preferably positioned in the vehicle remote from the console. The local input device 106 may be mounted in the vehicle or hand held.

The local input device 106 wirelessly transmits audio and video data from a wireless transmitter 150 to the wireless receiver 102 in the console 100. For example, a passenger with a portable device capable of storing and wirelessly transmitting media files, such as a PDA, PC or cellular telephone, wirelessly transmits a program in, for example, JPEG or MPEG format as a broadcast stream to the wireless receiver 102.

The local input device 106 includes processing components for formatting the audio and video data for wireless transmission (e.g., wireless radio frequency (RF) transmission) to the receiver 102 located in console 100. Formatting may include compression of the audio and video data using, for example, JPEG, MPEG, MPEG-2 and MPEG-4 procedures. The compressed audio and video data is formatted for wireless transmission, for example, RF transmission, on an appropriate frequency. The signal processing/conversion facilities 110 include components, such as demodulators and decoders to reformat the transmitted audio and video data for display. Such reformatting may include decompression of compressed audio and video data.

The signal processing/conversion facilities 110 may perform such processing/conversion prior to the wireless signals being provided to the display device 104 or any other device (e.g., speakers). The signal processing/conversion facilities 110 may include, but are not limited to, Digital Signal Processors (DSPs), and facilities for performing encoding/decoding, encrypting/decrypting, compressing/decompressing, analog-to-digital conversion (ADC), digital-to-analog conversion (DAC), and error correction. Such error correction may include, but is not limited to, Cyclic Redundancy Checking (CRC), Error Correction Code or Error Checking and Correcting (ECC), checksum, and so forth. With respect to encoding/decoding, encrypting/decrypting, and compressing/decompressing, the former of each pair can be performed by the input device (local input device(s) 106 and/or remote input device(s) 108) and the latter can be performed by the signal processing/conversion facilities 110. In the case of transmission of video and/or audio data from the console 100 to, for example, a display 105, speakers/headphones 170, the local receiving device 107, and/or to local and remote input devices 106, 108 equipped to receive data, the signal processing/conversion facilities 110 may be used to encode, encrypt and/or compress video and audio data for transmission from the wireless transmitter 118 to receivers in each respective device.

In many cases, the facilities described above may be implemented by one or more codecs. In other cases, additional and/or other circuitry may be required.

It is to be noted that the wireless signals may be encoded to prevent interference between different input devices in the vehicle 160 and between an input device in the vehicle 160 and an input device in a proximate vehicle. In such a case, the transmitters 118 and 150 may include facilities for transmitting the wireless signals that are based upon, for example, Spread Spectrum technology.

It is to be appreciated that the signal processing/conversion facilities 110 described above with respect to the console may be located separate from or as part of the wireless receiver 102. It is to be further appreciated that one of ordinary skill in the related art will contemplate these and various other facilities for performing signal processing and/or signal conversion, while maintaining the spirit and scope of the invention.

The processor 112 may be one or more processors. The processor may be used to control and/or interact with any of the elements associated with the console. The operating system 114 may be an operating system including, but not limited to, LINUX, WINDOWS 98, 2000, XP and so forth. Alternatively, the operating system 114 may be a streamlined operating system including, but not limited to WINDOWS CE.

It is to be understood that more than one local input device 106 may transmit audio and/or video data to the receiver 102. Simultaneous transmission of audio and video data from multiple input devices 106 to receiver 102 may be performed at different frequencies for each device so as to avoid interference.

The audio and video data received by the wireless receiver 102 is transferred to the DVR 111, which is capable of storing multiple programs for selective output to display devices 104 and 105 and/or to local receiving device 107. The DVR 111 may have a capacity in the range of about 50 to about 150 hours digital audio and video programming, but is not limited as such, and may have more or less capacity. In addition, other devices can be employed for storing audio and video programming, such as, for example, a PC or devices accepting removable storage media, such as portable hard disks, DVDs and CDs. The local receiving device 107 can be, for example, a cellular telephone, PC, laptop PC, MP3 player, PDA, another DVR, a satellite radio, an AM/FM radio, or other device capable of broadcasting, displaying, receiving and/or storing audio and/or video data.

The display devices 104, 105 are not limited to any particular kind of display device. Accordingly, display devices may be used which include, but are not limited to, liquid crystal displays (LCDs), light emitting diodes (LEDs), organic electro-luminescent displays (OELDs) and gas plasma. Any variations of the aforementioned types of displays also may be used. For example, with respect to liquid crystal displays, active matrix (e.g., thin film transistor) technology or passive matrix (e.g., dual scan) technology may be employed. The display device may also employ touch screen technology, so that users can interact with the console by either touching the screen or placing a specified device (e.g., electrostatic pen) near the screen. In an embodiment of the invention, a liquid crystal display is employed which uses active matrix technology.

Audio and video data pertaining to a specific program may be selected for output via a menu of programs appearing on display devices 104 and 105 and/or a display on a local receiving device 107. Audio and video programming is provided to display device 104 via bus 140 and to display 105 and local receiving device 107 via wireless transmission paths. Audio and video signals formatted for wireless transmission (e.g., compressed and encoded) by the signal processing/conversion facilities 110 are input to a wireless transmitter 118 and transmitted to receivers 151 and 152 located in the display 105 and the local receiving device 107. It should be noted that if the local receiving device 107 also functions as a local input device 106, a combination local input and receiving device may include both a transmitter 150 and a receiver 152 or a transceiver for transmitting and receiving audio and video data. Similarly, a remote input device 108 may include both a transmitter and a receiver or a transceiver for transmitting and receiving audio and video data.

The display 105 and the local receiving device 107 include components, such as demodulators and decoders to reformat (e.g., decompress) the transmitted audio and video data for broadcast. The display 104 is, according to an embodiment, a flip open display attached to the console 100. Display 105 may be may be positioned anywhere in the vehicle, such as on the back of a vehicle seat, in the hands of a passenger, on a center console or on the vehicle ceiling or wall. Any number of displays or local receiving devices may be used and the display 104 may be omitted from the console 100, with audio and video signals still being transmitted to displays 105 positioned remote from the console 100.

It is to be understood that multiple passengers in a vehicle may simultaneously view separate programs on different displays. The console 100 is capable of outputting different programs, such that displays 104 and 105, headphones/speakers 170 and/or a local receiving device 107 tuned to an appropriate channel or configured to select a specific program (e.g., through a selection made by an on-screen menu), can receive desired programs through either wired or wireless paths. For example, audio and video data may be wirelessly transmitted from multiple transmitters 118 via RF or infrared (IR) transmission, where different frequencies from each respective transmitter correspond to different programs. Each of multiple transmitters may have multiplexing capabilities or separate multiplexors may be used to enable selection of a particular program or input device whose audio and video data is to be wirelessly transmitted. Selection may be made through a SELECT (SEL) input.

Also, video and audio data pertaining to multiple programs may be wirelessly transmitted from the transmitter 118 in a broadcast stream, and a user may select a program for viewing on a display through, for example, a menu displayed on a screen of the display. In another embodiment a user may select a desired program stored on the DVR for transmission via a menu appearing on display 104.

In an alternative embodiment, the local input and receiving devices 106, 107 are connectable to the console 100 via ports and/or connectors, such as universal serial bus (USB) ports, pin connectors, XLR and RCA jacks, S-video connections, F-connections, and component video connections, whereby audio and video data is transmitted between the console 100 and the input and receiving devices via the ports and connectors.

In an alternative embodiment, the local input device(s) 106 includes a vehicle global positioning system (GPS) device capable of providing vehicle navigation information and/or a vehicle computer capable of providing vehicle diagnostic information (such as component information, speed, heading, temperature, gas and oil levels, vehicle performance, and so forth) in audio and/or video form to the console 100. The information can be supplied to the console 100 via wired or wireless paths and transmitted to the displays 104, 105 and/or to a local receiving device 107 as described herein.

A remote input device(s) 108 is similar in function to the local input device 106, but is located outside of the vehicle 160. The remote input device 108 can be located, for example, in a home, in a video store, at a service station, a car wash, or any location where a vehicle may be present for a period of time to receive and download media files to a storage device (e.g., DVR 111) in the vehicle. The remote input device 108 may be, for example, a computer including a database of media files stored in memory and/or capable of accessing the media files via a local area network (LAN), a wide area network (WAN) or a global network, such as the Internet. The remote input device 108 can also be a digital video recorder, a satellite (or satellite network) that provides multimedia content, or any other remote wireless device or network (e.g., GPS, cellular, and so forth). Given the prevalent use of satellites for the delivery of multimedia content (e.g., movies, telephone service, Internet and World Wide Web (the Web) content (e.g., streaming video), and so forth), this capability provides a seemingly endless supply of varying media types to a vehicle, with the significant advantage of not requiring additional, on-board equipment such as VCPs, CD players, DVD players, televisions, and so forth.

Like the local input device(s) 106, the remote input device(s) 108 includes a wireless transmitter 150 for wirelessly transmitting audio and video data from the remote input device 108 to the wireless receiver 102 in the console 100. The remote input device 108 includes processing components for formatting (e.g., compressing) the audio and video data for wireless transmission (e.g., wireless radio frequency (RF) transmission) to the receiver 102 located in console 100. The audio and video data received by the wireless receiver 102 from the remote input device 108 is transferred to and stored by the DVR 111 for subsequent distribution to displays 104, 105 and/or the local receiving device 107.

In operation, a driver of a vehicle may, for example, drive to a service station including a remote input device 108. While filling up the vehicle with gasoline, the driver can view on display 104 or 105, for example, a menu of potential video selections for downloading to the DVR 111. Upon selection of a video program and entering appropriate payment information or access codes, the driver can download from the remote input device 108 to the DVR 111, the selected media for later viewing. Such downloading is also capable of being performed from a home remote input device 108 capable of accessing a home library of media files.

Figure 1B:
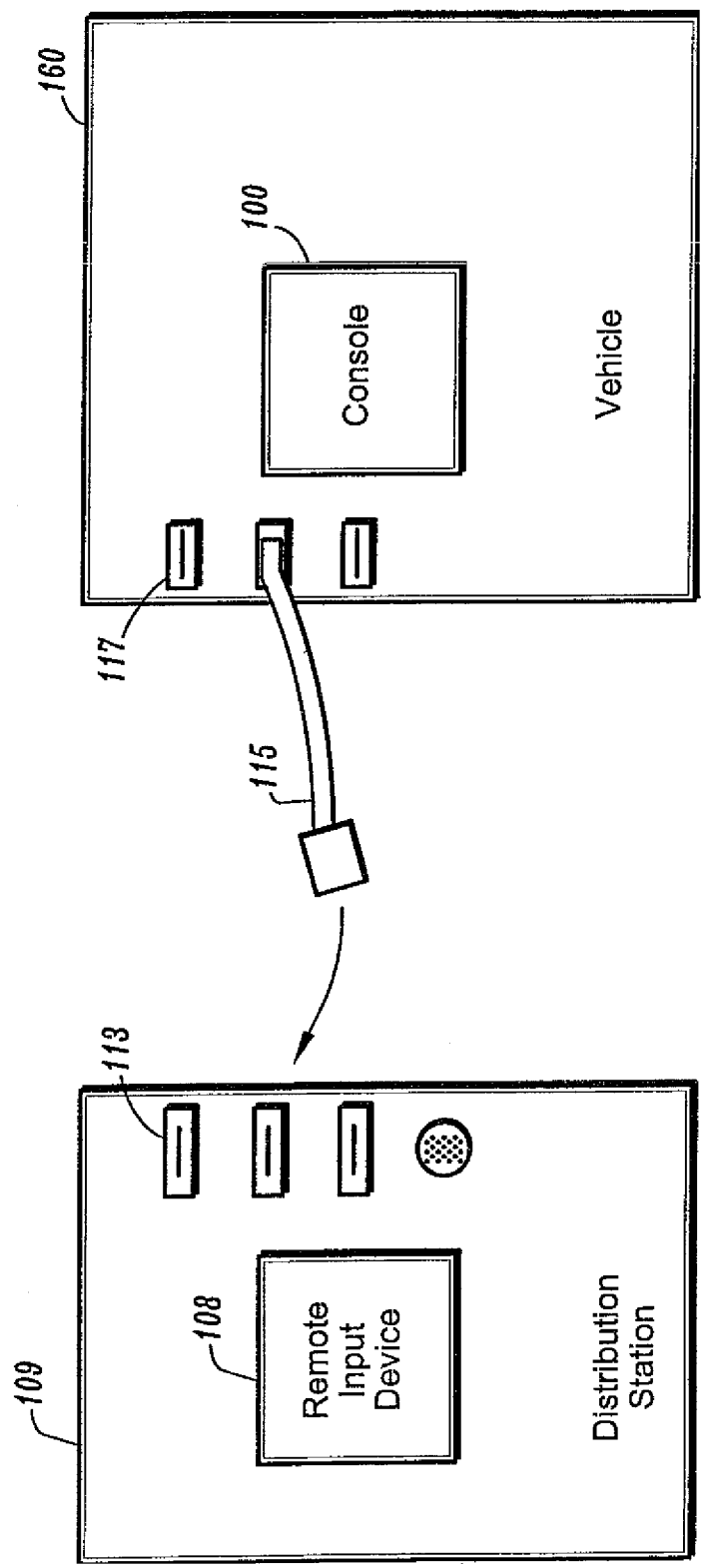
FIG. 1B is a block diagram illustrating a wired connection between a console in a vehicle and a distribution station according to an embodiment of the present invention.

Referring to FIG. 1B, in an alternative embodiment, the remote input device 108 is included in a distribution station 109 which can be physically connected to the vehicle and, in turn, the console 100 via a cable and ports and/or connectors. For example, the distribution station 109 may include ports and/or connectors 113 that receive a cable 115 connected to ports and/or connectors 117 located on the exterior of the vehicle 160. Accordingly, audio and video data is transmitted between the console 100 and the remote input device 108 via the cable 115 and the ports and/or connectors 113, 117.

Figure 1C:
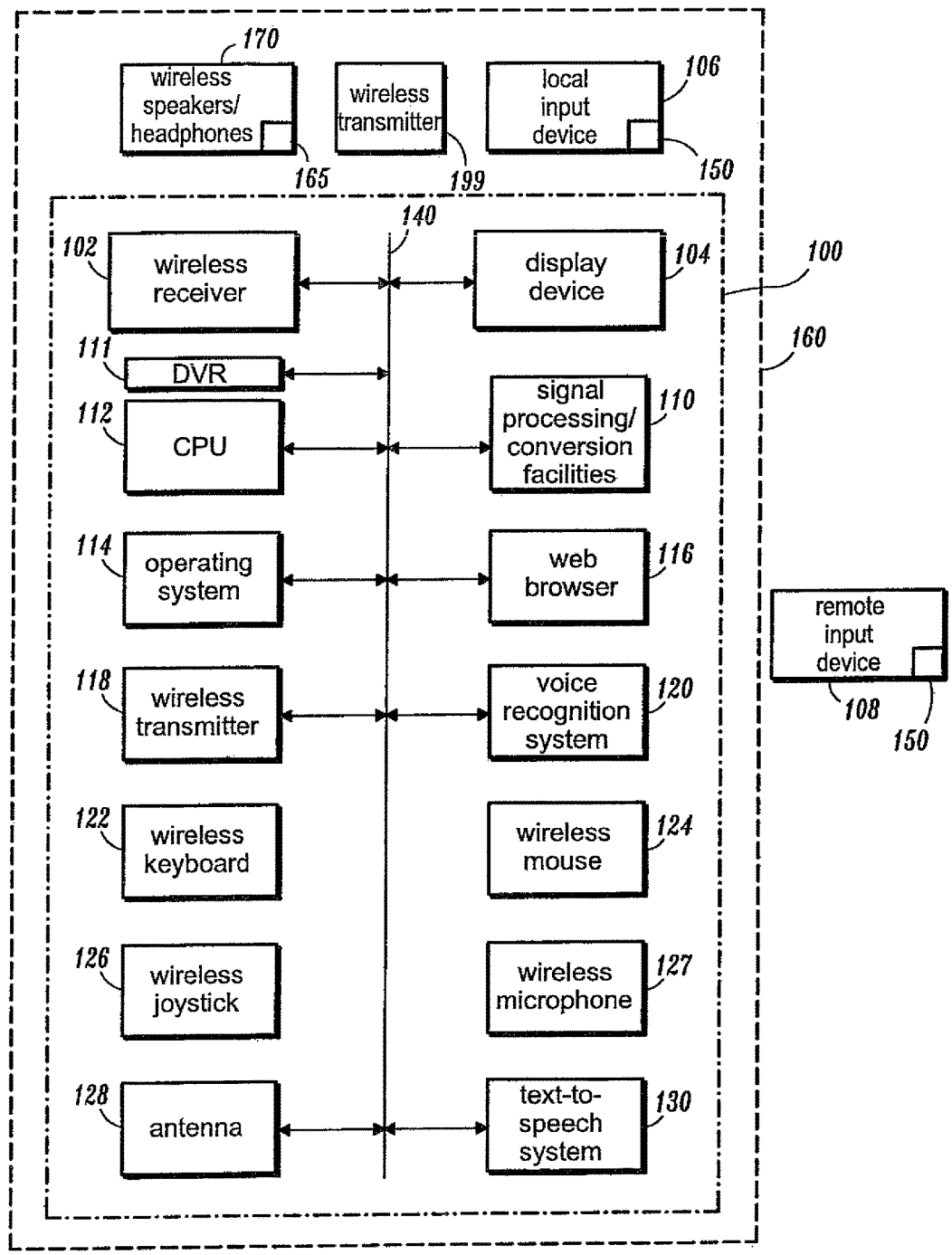
FIG. 1C is a block diagram illustrating a console in a vehicle according to an embodiment of the present invention.

FIG. 1C is a block diagram illustrating additional elements included in the console 100 according to another embodiment of the invention. In addition to the elements shown in FIG. 1A, the console 100 includes a web browser 116, a voice recognition system 120, a wireless keyboard 122, a wireless mouse 124, a wireless joystick 126, a wireless microphone 127, a text-to-speech system 130, and an antenna 128.

The browser 116 displays Internet and/or World Wide Web content, and allows the user to interact with same to, for example, download media wirelessly. The browser 116 may be any browser which is capable of interpreting, for example, a markup language (including, but not limited to, Wireless Markup Language (WML), General Markup Language (GML), Standard Generalized Markup Language (SGML), Hypertext Markup Language (HTML), Extensible Markup Language (XML), and so forth), other computer software language, and/or information sent via a protocol (including, but not limited to HyperText Transfer Protocol (HTTP), File Transfer Protocol (FTP), Transmission Control Protocol (TCP), Internet Protocol (IP) and so forth).

According to an illustrative embodiment of the invention, the browser 116 accesses the web using Wireless Application Protocol (WAP). WAP is a specification for a set of communication protocols that standardize the way in which wireless devices can be used for Internet access. WAP uses Wireless Markup Language (WML), which is a streamlined version of HTML for small screen displays. WAP also uses WMLScript, which is a compact JavaScript-like language. WAP also supports handheld input methods such as a keypad and voice recognition. It is to be appreciated that WAP is device independent and that the embodiments of the invention are not limited to WAP.

In place of input keys, buttons or switches positioned on the console 100, the voice recognition system 120, the wireless keyboard 122, the wireless mouse 124, the wireless joystick 126, and the wireless microphone 127 can be used to input information, control the console and functions corresponding thereto, and/or play a video game. It is to be noted that the wireless microphone 127 may be part of, or separate from, the voice recognition system 120. The console 100 may include a compartment or housing assembly for housing the wireless keyboard 122, the wireless mouse 124, the wireless joystick 126, and the wireless microphone 127, which may be removed therefrom when in use.

The text-to-speech (tts) system 130 may perform various functions with respect to the console 100, as is readily apparent to one of ordinary skill in the related art. For example, the tts system 130 may be used to convert WEB books and/or other textual media (e.g., newspapers, magazines, stock quotes, weather reports, and so forth) to speech for reproduction by, for example, wireless headphones or a speaker(s) (either existing, special purpose, or included in the display device 104).

As shown in FIG. 1C, the wireless transmitter 118 transmits audio to a speaker(s) having a wireless receiver 165 (e.g., wireless speakers/wireless headphones 170). In the case of wireless headphones 170, the display device 104 may be viewed by a vehicle passenger without the other passengers and/or driver hearing the accompanying audio. In an embodiment of the invention, wireless speakers 170, each having a wireless receiver 165 for receiving wireless signals from the wireless transmitter 118, are employed to minimize the wiring in the vehicle.

A wireless transmitter 199 may be employed by a vehicle passenger as a remote control unit for the displays 104 and 105 and/or the local input and receiving devices 106, 107. Wireless signals for configuring controls or applications on the display 104 and 105 and/or the local input and receiving devices 106, 107 may be received by the wireless receivers 102, 150, 151 and 152. The wireless transmitter 199 may include a processor and associated memory for executing and storing programs, respectively. The programs may be used to control many different types of devices including, for example, a cellular telephone.

In an embodiment of the invention, the wireless transmitter 199 is operatively coupled to the controls of the accessories commonly found in the dashboard of an automobile such as, for example, climate control and the controls for the radio and/or stereo. For example, the wireless transmitter 199 transmits control configuration signals to the wireless receiver 102 for display on the display device 104, and the display device 104, in turn, displays a plurality of control modules or devices, e.g., the keypad of a cellular phone and controls for selecting radio channels for selection via touch screen controls displayed on the display device 104. Given the teachings of the invention provided herein, one of ordinary skill in the related art will contemplate these and various other applications for the wireless transmitter 199.

Figure 2:
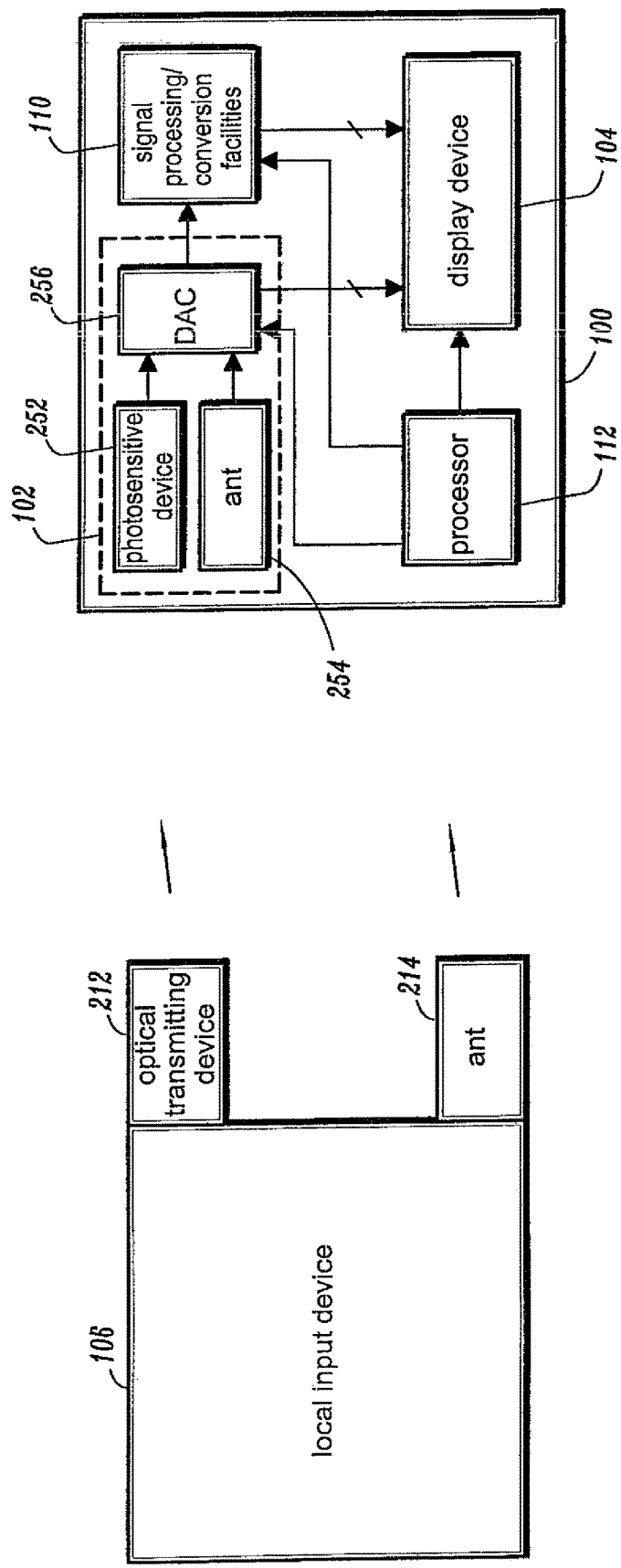
FIG. 2 is a diagram illustrating a local input device and a wireless receiver according to an embodiment of the present invention.

FIG. 2 is a diagram illustrating a local input device 106 interacting with the wireless receiver 102 based on optical, IR and/or RF transmission, according to an embodiment of the invention. The local input device 106 includes an optical or IR transmitting device 212 (e.g., an LED, a laser, and so forth) and an antenna 214.

According to an embodiment of the invention, the wireless receiver 102 receives wireless signals and provides the wireless signals to the display 104, as well as to other equipment (e.g., display 105, DVR 111, local receiving device 107, headphones/speakers 170). The wireless receiver 102 may be located within or external to the display device 104. As shown in FIG. 2, the wireless receiver interacts with other elements of the console, including, for example, the signal processing/conversion facilities 110 and the processor 112.

The wireless receiver 102 includes a photosensitive device 252 (e.g., a phototransistor, a solar cell(s), a SEED (self-optic effect device), and so forth) and an antenna 254. The optical transmitting device 212 and the photosensitive device 254 are respectively used for wireless transmission and reception of optical or IR signals. The antenna 214 and the antenna 254 are used for wireless transmission and reception of RF signals, respectively.

In the case of wireless optical transmission, the optical transmitting device 212 wirelessly transmits optical signals to the wireless receiver 102 by pulsing its light output (e.g., off equals a zero (0) and on equals a one (1)). The photosensitive device 252 in the wireless receiver detects the optical signals wirelessly transmitted by the optical transmitting device 212.

The wireless receiver 102 also includes a digital-to-analog converter (DAC) 256 for converting the digital signals into analog signals. Alternatively, the DAC 256 may be external to the wireless receiver 102 and/or included in the signal processing/conversion facilities 110. The analog signals are provided to the display device 104 either directly or after processing by the signal processing/conversion facilities 110. Such processing by the signal processing/conversion facilities 110 may include, for example, filtering of the analog signal.

It is to be appreciated that the processor 112 may be used to control the functions of the DAC 256 and the signal processing/conversion facilities 110.

The local input source 106 in the example of FIG. 2 may be a video cassette player (VCP), a television, a compact disk (CD) player, a digital video disk (DVD) player, a personal computer (PC), a laptop PC, a pager, a video game player, an MP3 player, a personal data assistant (PDA), a cellular telephone, and so forth. In the case of, for example, a DVD player, the digital output therefrom is transmitted wirelessly to the wireless receiver 102. The DAC 256 may then be used to generate three separate analog signals (left audio channel, right audio channel, and video). Alternatively, the DAC 256 may simply convert the wireless digital signal to a composite analog signal, which is then separated by the signal processing/conversion facilities 110.

The preceding description regarding the functions of the DAC 256 and the signal processing/conversion facilities 110 may be applied in the case of optical, IR and RF transmission. A modulator/demodulator may be included or associated with the antennas 214 and 254 to perform modulation and demodulation as known to one of ordinary skill in the related art.

In another embodiment of the invention, a DAC and signal processing/conversion facilities may be located in the local input device 106, and controlled by a programmable processor therein. The processor may be then programmed to function with the elements of the wireless receiver 102. Given the teachings of the invention provided herein, one of ordinary skill in the related art will contemplate these and other configurations allow for the transmission and reception of any of wireless signals and appropriate processing/conversion thereof.

It is to be appreciated that the console 100 of the present invention may include more than one display device 104, and more than one wireless receiver 102. In the case of more than one display device, two or more different sources (e.g., DVD player, satellite) may be used to feed each of the monitors.

It is to be further appreciated that, where appropriate, embodiments of the present invention can make use of wireless transmission techniques and standards, including, but not limited to, Bluetooth® and 802.11, to perform wireless transmission of audio and video data between the console and the displays and/or the input and receiving devices.

Figure 3:
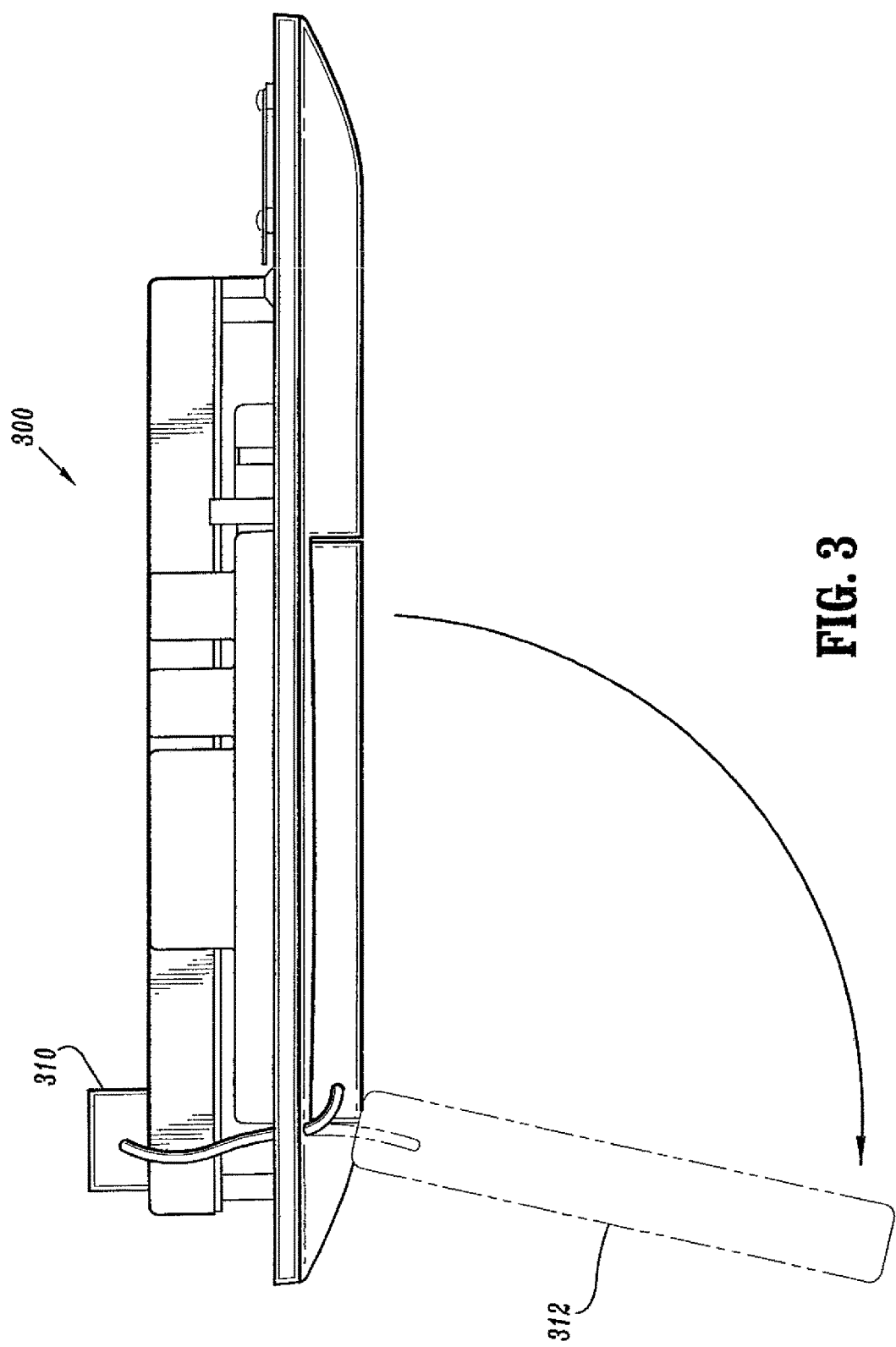
FIG. 3 is a perspective view illustrating a console according to an embodiment of the present invention.

FIG. 3 illustrates a configuration of a console 300 according to an embodiment of the invention. In the embodiment of FIG. 3, the display device is mounted overhead in a flip configuration. The console 300 includes a wireless receiver 310 and a display device 312. The display device 312 is mounted so as to flip down (e.g., 90 degrees) along the y-axis. The display device 312 may flip up and rest against the console 300 when not in use.

Figure 4:
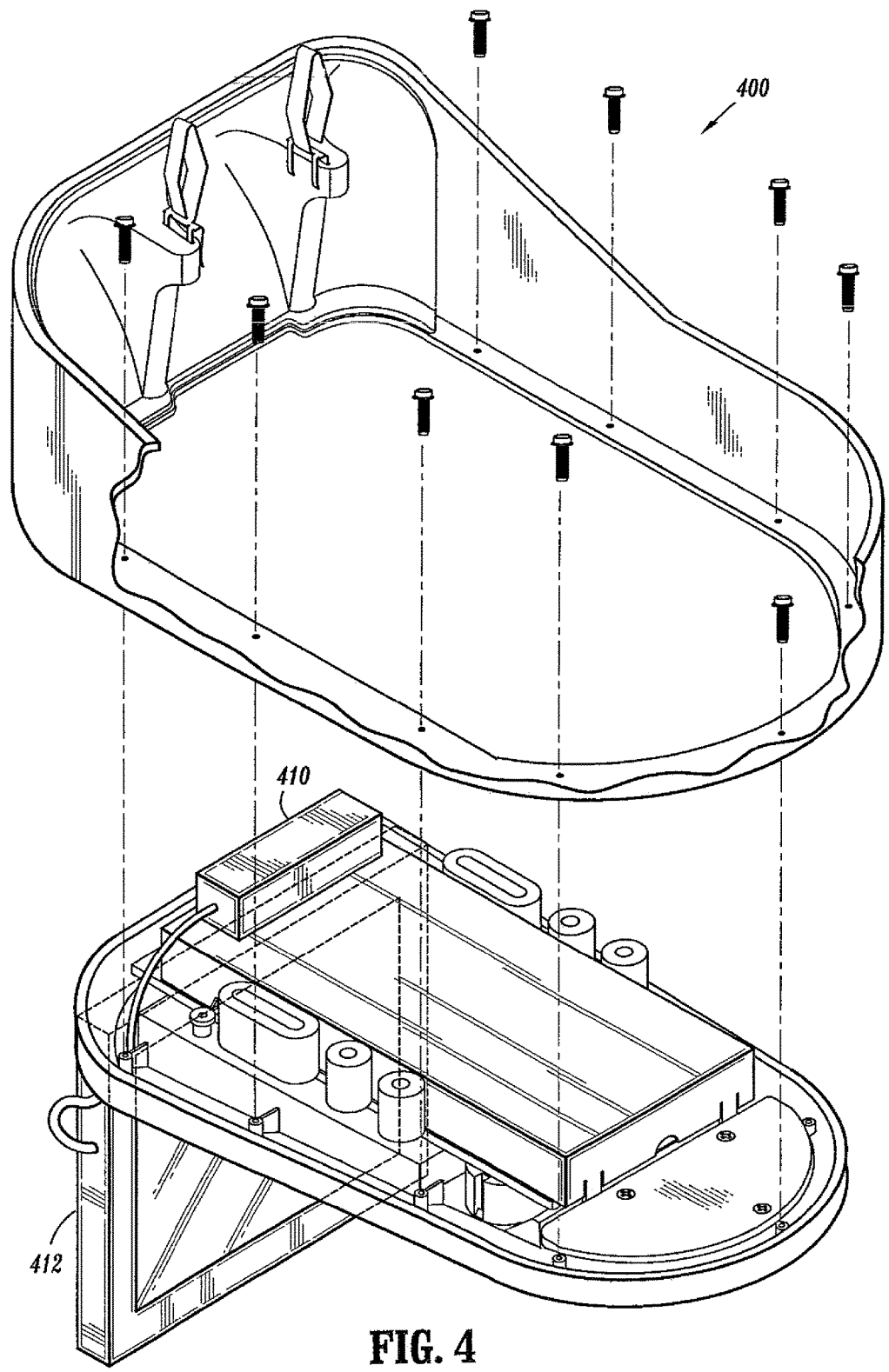
FIG. 4 is a perspective view illustrating a console according to an embodiment of the present invention.

FIG. 4 is a perspective view illustrating a console 400 according to another embodiment of the invention. In the embodiment of FIG. 4, the display device is mounted overhead in a non-flip configuration. The console 400 includes a wireless receiver 410 and a display device 412. Although FIGS. 3 and 4 illustrate the console being mounted against the interior roof of the vehicle, the console may be mounted anywhere in the interior of the vehicle including, for example, to a vehicle seat, a vehicle wall, the front portion of the vehicle or a combination of the roof and the front portion of the vehicle.

It is to be noted that, in addition to the above described elements, the console according to an embodiment of the invention may include, for example, a compartment for holding/protecting sunglasses, a compartment for holding/protecting a garage door opener, a compartment for general storing/protecting of items (e.g., keys, license, registration, and so forth), a reading/map lamp assembly, a clock, and a compass. Moreover, the console may include controls for other elements/systems of the vehicle such as controls for the air conditioning and heating systems and the audio system.

Figure 5:
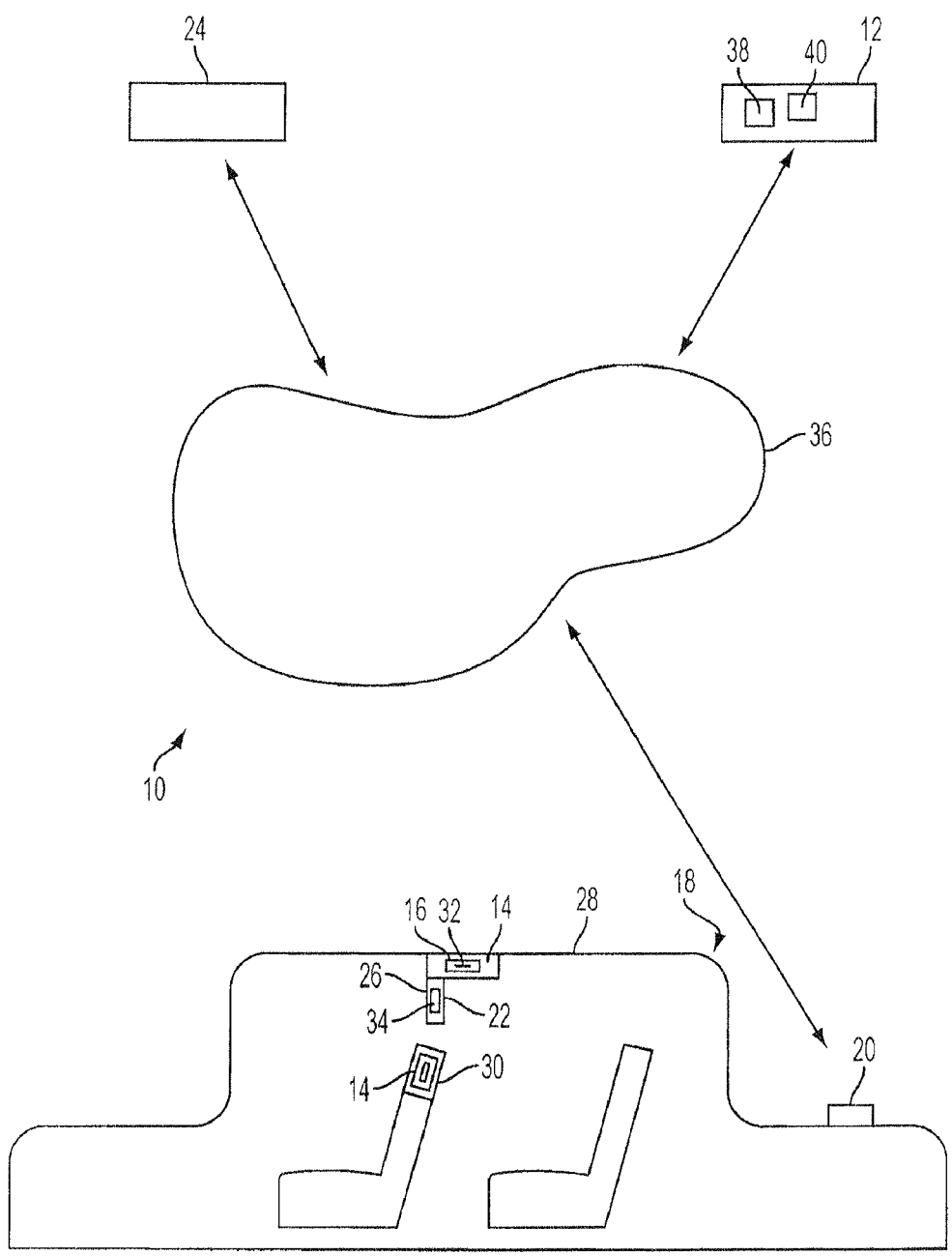
FIG. 5 is a block diagram of a mobile entertainment system according to an embodiment of the present invention.

FIG. 5 is a block diagram of another embodiment of the present invention. In the embodiment of FIG. 5 a mobile entertainment system 10 permitting retrieval of audio and video media content from a remote library 12 is disclosed. The mobile entertainment system 10 includes a video system 14 in combination with a media source 16. The video system 14 and media source 16 are housed within or attached to a housing 26 secured within an automobile 18. The media source 16 includes a storage medium 32 upon which audio and video media content is stored for display upon the video monitor 22 of the video system 14 as desired by a user.

A wireless global communication network access point 20 may be mounted within the automobile 18, either apart from the video system 14 or within the video system 16. The media source 16 includes wireless communication capabilities permitting communication with the wireless global communication network access point 20 for retrieval of audio and video media content for display upon the video monitor 22 of the video system 14. A remote library 12 of audio and video media content is in wireless communication with the media source 16 via the network access point 20. The remote library 12 includes storage space for uploading of media content from a personal collection of audio and video media content 24 stored, for example, as a home computer linked to the remote library via the Internet 36. The uploaded personal collection of audio and video media content 24 from a user for subsequent transmission to the media source 16 upon synchronization of the remote library 12 with the media source 16 thereby provides the user with access to a personal collection of audio and video media content 24. An access approval code is associated with the media source 16 instructing the remote library 12 to synchronize the personal collection of audio and video media content 24 with the media source 16 as desired by the user.

As briefly mentioned above, the mobile entertainment system 10 includes a video system 14 in combination with a media source 16. The video system 14 and media source 16 are housed within a housing 26 secured within an automobile 18. For example, and in accordance with a preferred embodiment of the present invention the video system 14 is mounted within the ceiling 28 of an automobile 18 for selective viewing by passengers in the rear seat of the automobile 18 or the video system 14 is mounted within a headrest 30 of an automobile 18 for viewing by those sitting in the rear seats of the automobile 18. While a ceiling mounting video system and a headrest mounted video system are disclosed in accordance with a preferred embodiment of the present invention, those skilled in the art will appreciate, other locations within an automobile are certainly possible without departing from the spirit of the present invention.

The media source 16 includes a storage medium 32 upon which audio and video media content is stored for display upon the video monitor 22 of the video system 14 as desired by a user. For example, and in accordance with a preferred embodiment of the present invention, the media source 16 is a hard drive or other electronic storage upon which both audio and video content, as well as other viewable content, may be readily stored. However, and as those skilled in the art will certainly appreciate, the media source may take a variety of forms as technology moves forward, without departing from the spirit of the present invention.

In addition to the provision of the media source 16 in conjunction with the video system, the video system may also be provided with a DVD player 34 or other similar media player allowing the operator to play videos when those available via the media source are not desired.

A wireless global communication network access point 20 is mounted within the automobile 18 and is in wireless communication with the media source 16 for the transfer of data therebetween. The wireless connection between the media source 16 and the network access point 20 may be achieved by various known protocols, for example, 802.11, but not limited to WiFi. While a wireless connection between the network access point and the media source is disclosed in accordance with a preferred embodiment of the present invention, it is possible the utilization of a conventional wired connection might be more appropriate under certain circumstances and the use thereof would certainly fall within the spirit of the present invention.

In accordance with a preferred embodiment of the present invention, the wireless global communication network access point 20 provides users with access to a global communication network 36, for example, the Internet, for access to a variety of data sources in a real time, high speed manner. The wireless global communication network 36 allows the media source 16, to which it is connected via the wireless global communication network access point 20, to synchronize with the remote library 12.

With this in mind, and as briefly discussed above, the media source 16 includes wireless communication capabilities permitting communication with the wireless global communication network access point 20 for retrieval of audio and video media content from the remote library 12 for display upon the video monitor 22 of the video system 14. As will be appreciated based upon the present disclosure, the media source 16 downloads information from the operator's personal collection of audio and video media content 24 or from a secure media source containing selected content maintained on the remote library 12 for storage therein and display upon the video monitor 22.

According to an alternative embodiment of the present invention, the wireless access point 20 resides within the video system 14. According to still another alternative embodiment, the wireless access point 20 serves as the wireless communication capabilities of the media source 16.

Thus, a remote library 12 of audio and video media content can be in wireless communication with the media source 16 via the wireless global communication network access point 20. The remote library 12 includes storage space 40 for uploading of media content from a personal collection of audio and video media content 24 from a user for subsequent transmission to the media source 16 upon synchronization of the remote library 12 with the media source 16 thereby providing the user with access to a personal collection of audio and video media 24.

As briefly mentioned above, an access approval code is associated with the media source 16 instructing the remote library 12 to synchronize the audio and video media content with the media source 16 as desired by the user. As a result, each time the media source 16 is activated, or when desired by the operator under certain circumstances, the media source 16 will communicate with the remote library 12 via the network access point 20 to ascertain whether additional audio or video content is available. If it is determined audio or video content is available for downloading, the content will either be downloaded to the media source 16 automatically or the user will be provided with a prompt asking whether he or she wishes to have the audio and/or video content download to the media source 16 for viewing upon the video monitor 22

In addition to providing the user with access to a personal collection of audio and video media content 24, the remote library 12 of audio and video content may also provide the operator with access to selected content 38 he or she subscribes to through a predetermined subscription arrangement. For example, the operator may be provided with access to a certain level of video content (for example, old documentaries) through the provision of one subscription fee or the operator may be provided with access to another level of video content (for example, first run movies) through the provision of another subscription fee.

Although the illustrative embodiments have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A mobile entertainment system, comprising:
a video system comprising a processor and in combination with a media source, the video system and media source are housed within a housing secured within an automobile;
the media source includes a storage medium upon which audio and video media content is stored for display upon the video system as desired by a user;
a wireless global communication network access point configured for retrieval of audio and video media content for display upon a video monitor, configured to wirelessly transmit the audio and video media content to a first local receiving device having a display, and configured to provide the first local receiving device with Internet access, wherein the first local receiving device is disposed in the automobile and remote from the housing;
at least one port disposed in the automobile, wherein the at least one port is configured to physically connect to a remote input device disposed external to the automobile via a cable; and audio and video media content is transmitted from the remote input device to the video system via the cable;
a remote library of audio and video media content in wireless communication with the media source via the wireless global communication network access point, the remote library including storage space for uploading of media content from a personal collection of audio and video media content from a user for subsequent transmission to the media source upon synchronization of the remote library with the media source thereby providing the user with access to a personal collection of audio and video media content, wherein audio and video media content that is in the remote library and is not available in local storage in the media source is downloaded to the media source upon synchronization of the remote library with the media source; and
an access approval code associated with the media source instructing the remote library to synchronize the audio and video media content with the media source as desired by the user, wherein the processor is configured to present a browser with a menu of video programs on the video monitor for selection by the user,
wherein a first selected video program is wirelessly transmitted to the first local receiving device, and audio content associated with the first selected video program is simultaneously wirelessly transmitted to wireless headphones corresponding to the first local receiving device on a first frequency,
wherein a second selected video program is wirelessly transmitted to a second local receiving device, and audio content associated with the second selected video program is simultaneously wirelessly transmitted to wireless headphones corresponding to the second local receiving device on a second frequency different than the first frequency.

2. A mobile entertainment system, comprising:
a housing secured within an interior of a vehicle;
a mobile video system housed within the housing, the mobile video system comprising:
a processor;
a video monitor;
a wireless access point configured to wirelessly receive first audio and video data from a media source disposed remotely from the vehicle, wirelessly transmit the first audio and video data to the video monitor and a first local receiving device having a display, and provide the first local receiving device with Internet access, wherein the first local receiving device is disposed in the vehicle and remote from the housing; and
a recording device, houseable in the mobile video system for recording the first audio and video data received from the media source,
wherein the processor is configured to present a browser with a menu of video programs on the video monitor for selection by a user,
wherein a first selected video program is wirelessly transmitted to the first local receiving device, and audio content associated with the first selected video program is simultaneously wirelessly transmitted to wireless headphones corresponding to the first local receiving device on a first frequency,
wherein a second selected video program is wirelessly transmitted to a second local receiving device, and audio content associated with the second selected video program is simultaneously wirelessly transmitted to wireless headphones corresponding to the second local receiving device on a second frequency different than the first frequency; and
at least one port disposed in the vehicle wherein the at least one port is configured to physically connect to a remote input device disposed external to the vehicle via a cable, and second audio and video data is transmitted from the remote input device to the mobile video system via the cable.

3. The mobile entertainment system of claim 1, wherein the user is further provided with access to selected content through a predetermined subscription arrangement via the media source and the wireless global communication network access point.

4. The mobile entertainment system of claim 1, wherein the media source establishes an Internet connection via the wireless global communication network access point, and synchronization of the remote library with the media source is performed using the Internet connection.

5. The mobile entertainment system of claim 1, wherein the media source and the wireless global communication network access point communicate with each other via a wired connection.

6. The mobile entertainment system of claim 1, wherein the media source and the wireless global communication network access point communicate with each other via a wireless connection.

7. The mobile entertainment system of claim 6, wherein the wireless connection is an 802.11 wireless connection.

8. The mobile entertainment system of claim 1, wherein the storage medium is a hard drive.

9. The mobile entertainment system of claim 1, wherein the video system is mounted to a ceiling in the automobile.

10. The mobile entertainment system of claim 1, wherein the video system is mounted to a headrest in the automobile.

11. The mobile entertainment system of claim 2, wherein a user is provided with access to selected content through a predetermined subscription arrangement via the mobile video system and the media source.

12. The mobile entertainment system of claim 2, wherein the housing is secured to a ceiling in the vehicle.

13. The mobile entertainment system of claim 2, wherein the housing is secured to a headrest in the vehicle.

14. The mobile entertainment system of claim 2, wherein the first local receiving device is a cellular telephone.

15. The mobile entertainment system of claim 2, wherein the wireless access point is configured to receive additional audio and video data from the first local receiving device, and the video monitor is configured to display the additional video data.

* * * * *